United States Patent [19]

Kamiya et al.

[11] Patent Number: 4,459,805

[45] Date of Patent: Jul. 17, 1984

[54] COMBUSTION BURNER APPARATUS

[75] Inventors: Sigeru Kamiya, Chiryu; Shigeru Takagi, Anjo; Masaei Nozawa, Kariya; Masahiro Tomita, Anjo; Nobutoshi Hayashi, Nishio, all of Japan

[73] Assignee: Nippon Soken, Inc., Nishio, Japan

[21] Appl. No.: 302,451

[22] Filed: Sep. 15, 1981

[30] Foreign Application Priority Data

Oct. 3, 1980 [JP] Japan .............................. 55-137734

[51] Int. Cl.³ .......................... F01N 3/38; F01N 3/02
[52] U.S. Cl. .................................... 60/303; 60/311;
431/208; 431/328
[58] Field of Search ................. 60/303, 311; 431/208, 431/211, 238, 239, 328

[56] References Cited

U.S. PATENT DOCUMENTS

| | | | |
|---|---|---|---|
| 2,920,450 | 1/1960 | Seglem | 431/208 |
| 3,418,979 | 12/1968 | Reichmann | 431/328 |
| 4,033,123 | 7/1977 | Masaki | 60/303 |
| 4,045,159 | 8/1977 | Nishi | 431/328 |
| 4,345,431 | 8/1982 | Suzuki | 60/303 |

*Primary Examiner*—Douglas Hart
*Attorney, Agent, or Firm*—Kenyon & Kenyon

[57] ABSTRACT

A burner device adapted for use in a particulate filter arranged in an exhaust system in a diesel engine for incinerating particles collected by the filter. The device includes a mixing chamber for mixing the fuel and the air, the chamber has nozzles for generating flows of the mixture directed to the combustion chamber. Means are provided for pre-heating the air introduced into the mixing chamber. A trapping vaporizer is provided for improving the vaporization of the fuel in the mixing chamber.

9 Claims, 3 Drawing Figures

COMBUSTION BURNER APPARATUS

FIELD OF THE INVENTION

The present invention relates to a liquid fuel combustion apparatus and more particularly to a liquid fuel combustion apparatus adapted to be used in a diesel engine for incinerating combustible particulates collected by a filter arranged in the engine.

BACKGROUND OF THE INVENTION

A diesel engine has, when compared with a gasoline engine, an advantage in that a high thermal efficiency is achievable. However, the diesel engine has a disadvantage in that the exhaust gas includes particulates, such as carbon, which may contaminate the environment. Various systems have been heretofore presented, arranged in the exhaust pipe of the engine for removing such particulates. One known system includes a device which comprises a filter element made of a heat resistant material which is packed in a casing and located in the exhaust path of the diesel engine. The heat resistant filter element is in many cases formed as a porous ceramic structure having air permeability, or a compacted metal wire mesh. The particulates in the exhaust gas of the diesel engine are collected by the filter element without being expelled into the atmosphere. During the use of the filter element it becomes clogged by the collected particulates so that the exhaust gas cannot pass easily through the filter, causing the output power of the engine to be decreased. In order to overcome this difficulty, a pair of such filter elements are arranged in the casing, which elements are selectively and alternately used by a change-over valve. When one of the filters through which the exhaust gas is passed is clogged, the change over valve is operated so that the path to the other filter element is opened. As a result of this the exhaust gas is now directed to the other fresh filter element. The exhaust path which includes the clogged filter element is closed by the change over valve, and the clogged filter element is subjected, during the running of the engine, to a refreshing process to remove the particulates collected by the clogged filter element. In order to refresh the filter element, a combustion burner is used for incinerating particulates collected by and clogged in the filter element.

Since the burner is a part which is included in the vehicle, the burner should be small and light as well as have a small amount of component to be exhausted, such as unburnt hydrocarbon which contaminates the environment. One such burner is of the liquid fuel vaporization type and is described in Japanese Laid-Open Patent No. 54-161127. As described therein, the liquid fuel is vaporized by the heat of an electrical heater. In this type of burner the fuel is atomized under the influence of a centrifugal force and is introduced into the mixing chamber, so that atomized fuel contacts the wall of the mixing chamber. Since the wall is heated by an electric heater device, the fuel is thermally vaporized so that the vaporized fuel forms, together with air introduced into the combustion chamber, a gaseous combustible mixture. In this type of burner, since the combustion air is not heated, the thermally vaporized fuel at the high temperature of the wall is cooled and condensed to liquid particles when the fuel is mixed with the low temperature air. This is disadvantageous in that the vaporization of fuel is not effectively attained. This drawback is increased when fuel such as diesel fuel is used, because diesel fuel has a high density and requires a high vaporization temperature. Since the speed of the air in the region of the wall of the mixing chamber is low, the density of the vapor at that region becomes high, causing the speed of the vaporization to be low. Thus, a disadvantageously large surface area is necessary for vaporizing a necessary amount of the fuel and a burner of large dimensions is necessary. It should be noted that the necessity of a large vaporization area causes a large amount of fuel to be always attached on the wall. Thus, a long period is necessary from the start of the supply of fuel until a sufficient amount of fuel is attached to the wall to cause the density of fuel to reach an ignitable level. This leads to a further drawback in that unburnt fuel is exhausted to the atmosphere during this period. Moreover, unburnt fuel is also exhausted for a relatively long time after the supply of fuel is stopped. The temperature of the wall can be increased in order to vaporize a large amount of fuel on a small area. In this case, the temperature become higher than a predetermined temperature for generating a so-called "Loidenfrost effect" wherein particles of liquid fuel contacting the wall are enveloped by films of vapor, causing the particles to stay on the wall for a long period, so that the vaporization is delayed. This results in a further drawback in that the determination of the temperature of the wall is critical in the type of burner where the fuel is attached on to the wall to be vaporized.

It is, therefore, an object of the present invention to provide a combustion burner apparatus capable of vaporizing a large amount of liquid fuel, irrespective of a small dimension of the apparatus.

SUMMARY OF THE INVENTION

According to the present invention, a combustion burner for liquid fuel comprises:
 (a) first passageway means for supplying a liquid fuel;
 (b) second passageway means for supplying air;
 (c) heater means associated with the second passageway means for heating the air passing through the second passageway means;
 (d) a mixing chamber communicating with both, the first and the second passageway means, for mixing the liquid fuel and the heated air to generate mixed gas comprised of air and a vaporized fuel in the mixing chamber;
 (e) a combustion chamber communicating with the mixing chamber;
 (f) nozzle means located between the mixing chamber and the combustion chamber for generating flows of mixed gas directed to the combustion chamber; and,
 (g) means arranged in the combustion chamber for igniting the flows of mixed gas from the nozzle means so that flames are generated in the combustion chamber.

In a preferred embodiment, further comprises at least one trapping vaporizer having labyrinthine passageways for trapping unvaporized fuel in the mixing chamber and for promoting the vaporization of the trapped fuel.

DETAILED DESCRIPTION OF THE PREFERRED EMBODIMENTS

Figure 1:
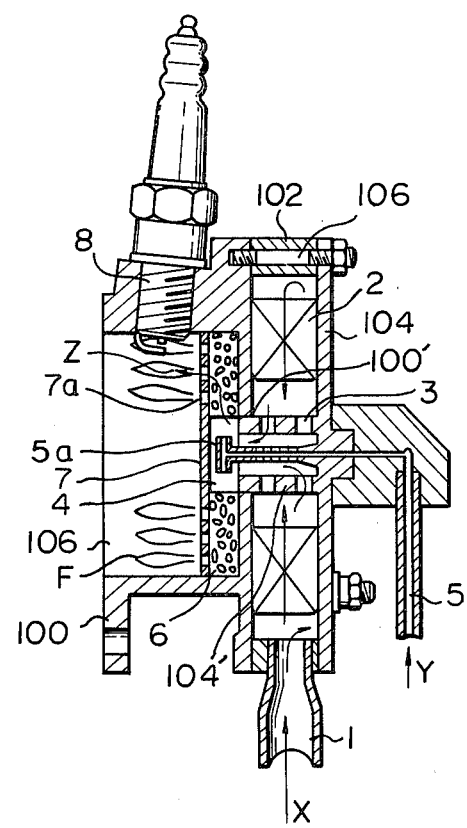
FIG. 1 shows a cross-sectional view of a first embodiment of a combustion burner according to the present invention.

The present invention is described with reference to the attached drawings. In FIG. 1 showing a first embodiment of a combustion burner according to the present invention, it includes a body 100 to which a disk 104 is connected by means of bolts 106 passed through a spacer ring 102 arranged between the body 100 and the disk 104, and of nuts connected to the bolts. An air introduction pipe 1 is connected to the spacer ring 102 so that the pipe 1 is opened to a space formed between the body 100, the disk 104 and the ring 102. In the space an electric heater block 2 is arranged for pre-heating of the introduced air. The disk 104 is at its central portion provided with an annular projection 104'. An end of the body facing the disk 102 is provided with an opening 100' to which an end of the projection 104' is inserted. The annular projection has a plurality of radial holes 3. Arranged in the body 100 is a trapping vaporizer 6 made of a material provided with a plurality of labyrinthine passages, such as a porous metal of annular shape or a profiled compacted wire net. Adjacent to the trapping vaporizer 6 a plate 7 is arranged. A mixing chamber 4 is formed by one side of the plate 7, the annular projection 104' and the trapping vaporizer 6. On the other side of the plate 7 remote from the mixing chamber 4 a combustion chamber 106 is formed. A spark plug 8 is connected to the body so that a spark gap is located in the combustion chamber 106. The plate 7 has on its outer peripheral portion a plurality of nozzles 7a for generating flames directed into the combustion chamber 106. A fuel nozzle 5a made as a T-shaped pipe is arranged in the mixing chamber 4. The nozzle is at its T-shaped end opened to the mixing chamber 4. The other end of the nozzle 5a is via a fuel introduction pipe 5 connected to a liquid fuel source (not shown).

An operation of the burner of FIG. 1 is a hereinbelow described. Air from a combustion air supply system (not shown) provided with a pump is introduced into the burner via the air introduction pipe 1 as shown by an arrow X. The air is then passed through the electric heater block 2, so that the temperature of the air reaches to 200°~300° C. The thus preheated air is introduced into the mixing chamber 4 via the holes 3.

The fuel metered by a liquid fuel supply apparatus (not shown) is introduced into the burner via the pipe 5 as shown by an arrow Y. The thus introduced fuel is discharged into the mixing chamber 4 from the nozzle 5a. The fuel is mixed with the heated air in the mixing chamber 4. A part of the fuel is instantly vaporized and is introduced into the vaporizer 6 under a gaseous condition. The remainder of the fuel is introduced into the vaporizer under the particulated liquid state. In the gas-liquid mixture at the trapping vaporizer, the gaseous part is passed therethrough and is discharged to the combustion chamber 106 via the nozzles 7a in the flame holding plate 7 as shown by an arrow Z. The fuel introduced into the trapping vaporizer under the particulated liquid condition is quickly vaporized when the liquid is passed through the labyrinthine passages in the vaporizer 6 due to the fact that the liquid contacts with the surface of the passages, causing the liquid to be subjected to the conduction heat from the vaporizer and to the heat from the pre-heated air. The vaporized fuel is also discharged from nozzle 7a of the plate.

The thus formed mixed gas flow is ignited by the electrical arc generated in the spark gap so as to form a flames F.

According to the present invention, the fuel is introduced into the heated air so that the fuel subjected to the strong flow is easily vaporized. Since the wall heating principle is not employed, the temperature of the combustion chamber is selected to be any required temperature without consideration of the Leidenfrost phenomenon. The provision of the trapping vaporizer having labyrinthine passages, made of a porous metal block or a profiled wire net arranged in the mixing chamber for passing the mixed air from the mixing chamber, makes it possible to collect unvaporized liquid fuel particles so that the fuel is subjected to the air fuel mixture in gaseous state at high speed, in order to cause the liquid to be quickly vaporized. Even if the temperature of the vaporizer is higher than the Leidenfrost temperature an effective vaporization characteristic is obtained due to the fact that a large number of contacts takes place between the particles of liquid fuel and the inner surface of the labyrinthine passageway. Thus, the present invention makes it possible to provide a small dimensioned burner, capable of reducing the amount of unburnt hydrocarbon exhausted when the operation of burner is started or stopped.

When the burner is operated, an introduction of the pre-heated air and the energization of the heater for heating of the air are effected for 1~3 minutes so that trapping vaporizer 6 reaches a predetermined temperature before the liquid fuel is introduced into the burner. After a lapse of the time the supply of liquid fuel is started and simultaneously combustion of fuel is effected for a certain time which is necessary for incinerating the particulates trapped in the filter element. However the time necessary for combustion is long. Thus, when the heater of a small output is used the vaporizer is gradually cooled by the vaporization heat of the fuel, so that combustion can not be ideally effected. Thus the heater should have a thermal output which is large enough to render negligible the effect of cooling by the vaporization. A second embodiment of the present invention shown in FIG. 2 is directed to an embodiment capable of using a heater of small thermal output while maintaining an effective combustion.

Figure 2:
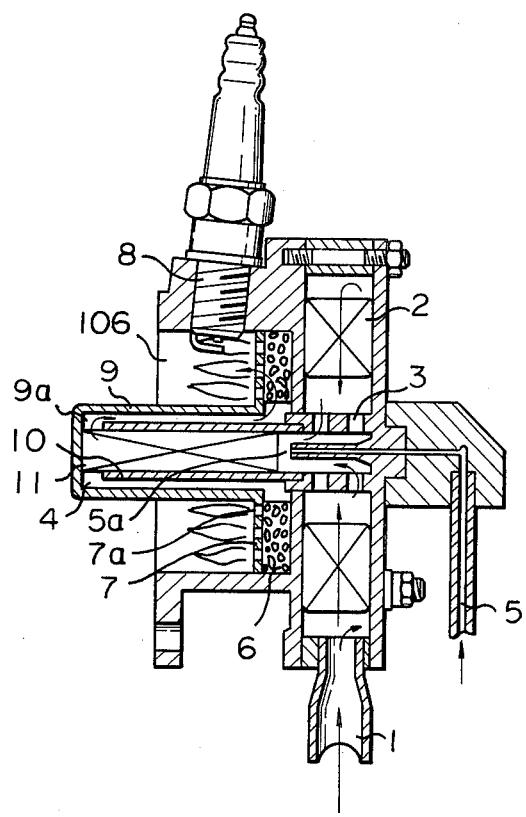
FIG. 2 shows a cross-sectional view of a second embodiment of a combustion burner according to the present invention.

In FIG. 2, the same parts as those in FIG. 1 are shown by the same reference numerals. In FIG. 2 a reference numeral 9 indicates a tubular member integrally projected from the center portion of the flame holding plate 7 toward the combustion chamber 106. One end of the member 9 adjacent to the plate 7 is opened so that a mixing chamber 4 is formed inside the tubular member 9. A pipe of smaller diameter than that of the member is arranged in the member for directing the preheated, air from the holes 3 and the fuel from the nozzle 5 to the closed end of the tubular member 9. In this embodiment the nozzle 5 has a straight end 5a. Preferably, a second trapping vaporizer 11 having substantially the same construction as that of the trapping vaporizer 6 may be arranged in the tubular member.

During the operation of the second embodiment shown in FIG. 2, the mixed gas in the mixing chamber 4 is effectively heated due to the fact that the mixing chamber 4 is formed inside the tubular member 9 which project toward the combustion chamber 106, so that an outer wall of the tubular member 9 is exposed to the flames F generated in the combustion chamber 106. The mixed gas in the mixing chamber is thus heated by the heat generated by the combustion in the combustion chamber. Since the mixed gas is thus heated, the cooling of the vaporizer is prevented even if prolonged combustion is effected. Thus, a small output heater may be used to continue the combustion.

As a modification of the embodiment shown in FIG. 2, heat exchanger fins may be provided on the outer surface of the tubular member 9 for increasing an area for receiving the heat from the chamber 106. In this case, supply of electric current is stopped after the combustion takes place while maintaining combustion in the combustion chamber. The installation of the trapping vaporizer 11 in the mixing chamber can improve vaporization of the unvaporized fuel in the mixing chamber.

Figure 3:
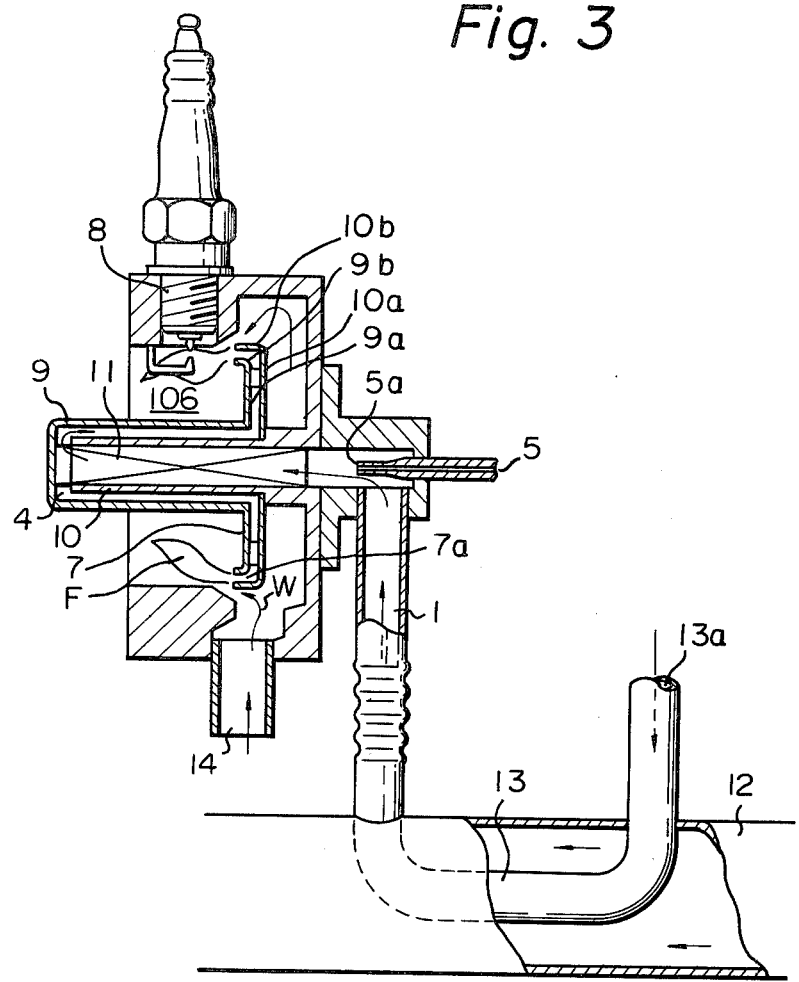
FIG. 3 shows a cross-sectional view of a third embodiment of the combustion burner according to the present invention.

FIG. 3 shows a third embodiment of the present invention, in which parts substantially the same as those in the previous drawings are indicated by the same reference numerals. In place of the electrical heater 2 in the FIG. 1 or 2, the burner in FIG. 3 includes a means for preheating the combustion air by means of the heat generated from the exhaust system of the engine. In FIG. 3, a reference numeral 12 indicates an exhaust pipe of the engine. A pipe 13 for heating the combustion air is arranged so that it contacts the exhaust gas passing through the exhaust pipe 12. One end of the combustion air heating pipe 13 is connected to a source (not shown) for supplying air. The other end of the pipe 13 is connected to the air inlet pipe 1 for introduction of the heated air into the burner. The embodiment shown in FIG. 3 also differs from the construction in FIG. 2 from the point of view of construction of the mixing chamber or combustion chamber. A plate 10a is connected to the tubular member 10, which has a forwardly bent peripheral edge 10b. The tubular member 9 has a flange portion 9a located slightly spaced from the plate 10 and having forwardly bent edge 9b. An annular nozzle 7a is formed between the edge portions 9b and 10b. An auxiliary air inlet 14 is opened to the combustion chamber 106 so that a flow of auxiliary air as shown by an arrow W is generated for improving the combustion in the combustion chamber 106.

During the operation of FIG. 3, the air passing through the pipe 13 is heated by the exhausted gas passing through the exhaust pipe 12. Thus, a pre-heating of the air introduced into the mixing chamber is effected. (An electrical heater similar to those in FIG. 1 or 2 may be additionally incorporated in this embodiment if necessary.) The temperature of the air is changed in accordance with the temperature of the exhaust gas which varies in accordance with the engine operating conditions. However, according to the present invention a unique principle differing from the prior art is used to vaporize fuel, wherein the vaporization is effected by the heated air, a trapping vaporizer is used to promote the vaporization, and the vaporization is effected irrespective of the Leidenfrost temperature. Thus, use of the temperature of the exhaust gas which changes is sufficient to vaporize the fuel.

Although the present invention is described with reference to the attached drawings, many modifications and changes may be made by those skilled in this art without departing from the scope of the invention.

We claim:

1. A combustion burner for liquid fuel, comprising:
   (a) first passageway means for supplying a liquid fuel;
   (b) second passageway means for supplying air;
   (c) heater means associated with said second passageway means for heating said air passing through said second passageway means;
   (d) a mixing chamber communicating with both, said first and said second passageway means, for mixing said liquid fuel and said heated air to generate a mixed gas in said mixing chamber;
   (e) a combustion chamber communicating with said mixing chamber;
   (f) a trapping vaporizer having labyrinthine passageways for trapping unvaporized fuel in said mixing chamber, and for promoting vaporization of said unvaporized fuel, said trapping vaporizer having a substantially annular shape and an end face directed toward said combustion chamber, said heated air and said liquid fuel being received radially at an inner peripheral portion of said trapping vaporizer, and expelled axially from said end face;
   (g) nozzle means located between said mixing chamber and said combustion chamber for generating flows of said mixed gas directed to the combustion chamber; and,
   (h) means arranged in said combustion chamber for igniting said flows of mixed gas from said nozzle means so that flames are generated in said combustion chamber.

2. A combustion burner according to claim 1 wherein said trapping vaporizer is made of a porous metal block or a compacted wire mesh.

3. A combustion burner according to claim 1 wherein said heater means comprises an electric heater block arranged in the second passageway means.

4. A combustion burner according to claim 1 wherein said heater means comprises a pipe connected to said second passageway means, said pipe being arranged in such a manner that it contacts exhaust gas passing through the exhaust system of an engine.

5. A combustion burner according to claim 1 wherein said mixing chamber has a portion which projects into said combustion chamber so that an outer wall of said mixing chamber is exposed to said flames generated in said combustion chamber, thereby causing said mixed gas in said mixing chamber to be heated.

6. A combustion burner according to claim 5, wherein said mixing chamber has, at an outer surface of said portion projecting into said combustion chamber, a plurality of fins.

7. A combustion burner according to claim 1 wherein said trapping vaporizer is arranged between said mixing chamber and said combustion chamber.

8. A combustion burner according to claim 5, wherein said trapping vaporizer is arranged in said portion of said mixing chamber which projects into said combustion chamber.

9. A combustion burner according to claim 8, wherein there is provided a further trapping vaporizer arranged between said combustion chamber and said mixing chamber.

* * * * *